Feb. 26, 1952   J. W. CHAMBERLAIN   2,587,287
SELF-CLOSING GATE
Filed July 20, 1949
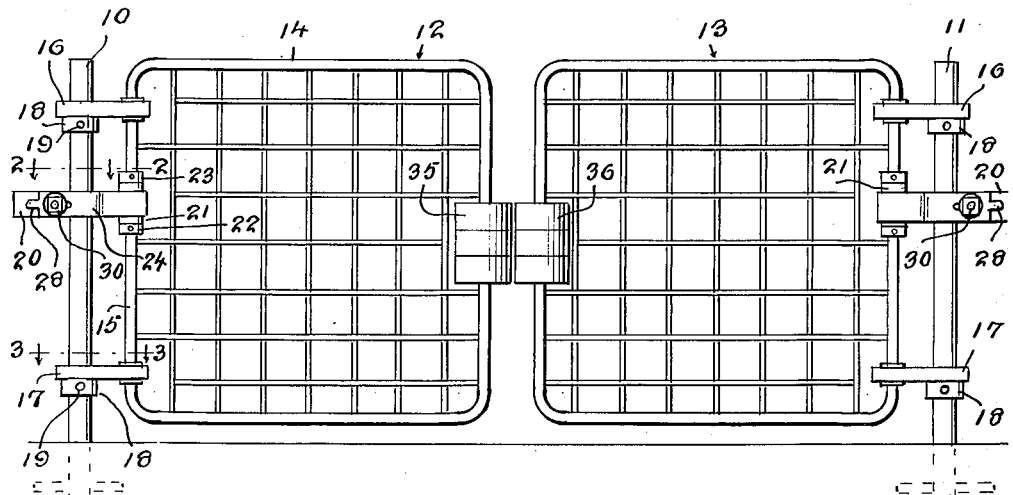
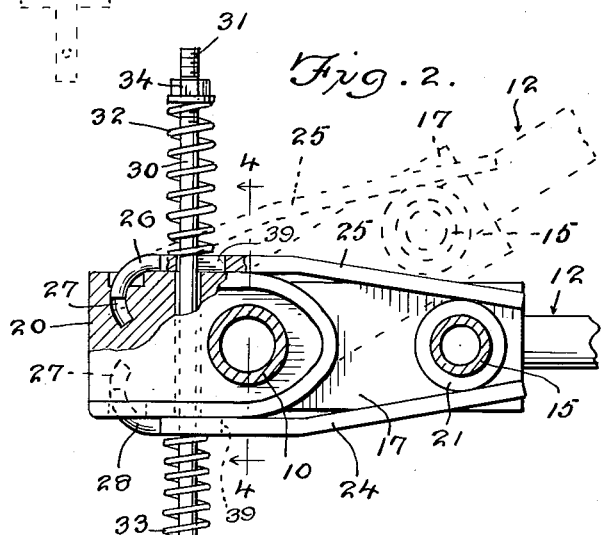
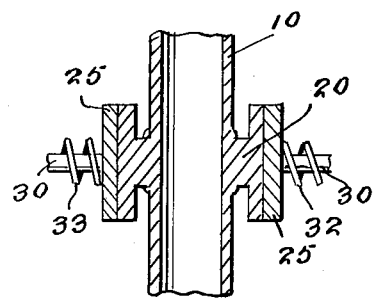
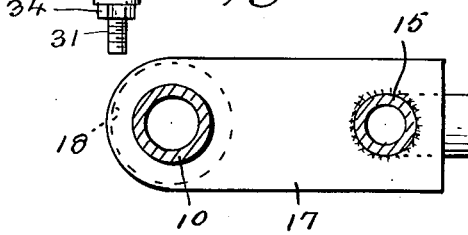
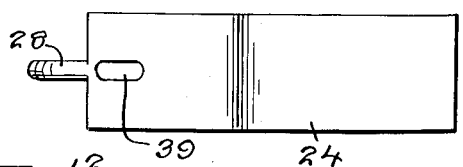
INVENTOR.
John W. Chamberlin
BY Victor J. Evans & Co.
ATTORNEYS Patented Feb. 26, 1952

2,587,287

UNITED STATES PATENT OFFICE 2,587,287

SELF-CLOSING GATE

John W. Chamberlain, Iron Mountain, Mich.

Application July 20, 1949, Serial No. 105,746

1 Claim. (Cl. 39—32.)

This invention relates to a gate, and more particularly to a gate adapted to be actuated by a vehicle.

The object of the invention is to provide a gate which is normally closed across a road or driveway, and which will be opened when a vehicle contacts the gate.

Another object of the invention is to provide a gate which is normally urged into its closed position, and wherein the gate is opened by an approaching vehicle without the necessity of having the occupant of the vehicle alight therefrom.

A further object of the invention is to provide a gate which is extremely simple and inexpensive to manufacture.

Other objects and advantages will be apparent from the following description.

In the accompanying drawings, forming a part of this application, and in which like numerals are used to designate like parts throughout the same:

Figure 1 is a front elevational view of the gate, according to the present invention;

Figure 2 is an enlarged sectional view taken on the line 2—2 of Figure 1;

Figure 3 is an enlarged sectional view taken on the line 3—3 of Figure 1;

Figure 4 is a sectional view taken on the line 4—4 of Figure 2; and

Figure 5 is a view showing certain constructional details of the gate.

Referring in detail to the drawings, the numerals 10 and 11 designate a pair of spaced parallel vertically disposed posts or uprights which have their lower ends embedded in concrete or the like. The post 10 has a gate 12 hingedly connected thereto, and the other post 11 has a similar gate 13 hingedly connected thereto, the gates 12 and 13 being mounted for swinging movement about a vertical axis.

Since each of the gates 12 and 13 has the same construction, it will suffice to describe only one in detail. Thus, the gate 12 includes a rectangular frame 14, and the frame 14 includes a vertically disposed tubular member 15. A pair of spaced parallel horizontally disposed hinges 16 and 17 hingedly connect the gate 12 to the post 10 while a similar pair of hinges 16 and 17 connect the gate 13 to the other post 11. The hinges 16 and 17 are each secured, as by welding, to the vertical portion 15 of the gate, as best seen in Figure 3. The hinges 16 and 17 are rotatably mounted on the posts 10 and 11. A collar 18 is arranged just below each of the hinges 16 and 17, and a set screw 19 projects through the collar 18 and into engagement with the post 10 or 11. The collars 18 provide support for the hinges.

Arranged intermediate the ends of the post 10 is a block 20, the block 20 being secured to the post 10. A roller 21 is rotatably mounted on the vertical portion 15 of the gate 12. A pair of collars 22 and 23, Figure 1, are arranged on opposite sides of the roller 21 for preventing vertical movement of the latter. A pair of spaced straps 24 and 25 straddle the roller 21 and the block 20 for a purpose to be later described.

One end of the strap 25 is provided with a curved end 26 which slidably fits into an arcuate recess 27 in the block 20. The strap 24 is also provided with a curved end 28 which projects into an arcuate recess 29 in the opposite side of the block 20. A horizontally disposed rod 30 projects through registering openings in the strap 24, block 20 and through the other strap 25. The outer ends of the rods 30 are threaded exteriorly as at 31, there being a pair of coil springs 32 and 33 circumposed on the rod 30 for normally urging the parts of the mechanism to the position shown in solid lines, Figure 2. A suitable securing element, such as a nut 34 is arranged in threaded engagement with each of the threaded ends 31 of the rod 30, and the nuts 34 may be adjusted on the rod 30 to vary the tension on the springs 32 and 33.

The gate 12 has a rubber bumper 35 mounted thereon, and the other gate 13 has a similar rubber bumper 36 mounted thereon. The bumpers 35 and 36 are contacted by the vehicle to cause the gates to swing open to allow the vehicle to pass therethrough.

In use, the gates 12 and 13 are normally in their closed position as shown in Figure 1. Then, as the vehicle moves along the roadway, it contacts the rubber bumpers 35 and 36 to cause the gates 12 and 13 to swing open about the posts 10 and 11. Thus, the gate 12 moves from the solid line position as shown in Figure 2 to the dotted line position shown therein. Similarly, the other gate 13 swings about the post 11. As the gate 12 pivots, it moves the strap 25 which compresses the spring 32 and when the vehicle has passed through the gate, the springs 32 and 33 will return the gates to their normal closed position.

The gate will be opened by a vehicle approaching from either direction, the vehicle gently bumping the soft rubber bumpers 35 and 36. Thus, the gates will be opened and closed without the necessity of stopping the vehicle or having the occupant alight therefrom. The gate is of simple mechanical construction, requires little or no maintenance, and works in any weather or climatic conditions with the same efficiency.

Further, the gate can be provided with a commonly marketed electric fence mechanism when it is desired to prevent the entrance or escape of live stock through the gate. Thus, it is apparent that the user on foot or in a vehicle would be protected by the rubber bumpers 35 and 36 which also function, in this case, as insulators.

The opening in the straps 24 and 25, through which the rod 30 projects, is designated by the numeral 39.

What I claim:

In a spring closing device for a gate including a tubular frame hingedly connected to a post, a block secured to said post, a roller arranged adjacent said block and rotatably mounted on the tubular frame of said gate, a pair of spaced straps straddling said roller and block, a horizontally disposed rod extending through said straps and block, a coil spring circumposed on each end of said rod and contacting said straps, and means for varying the tension of said coil springs.

JOHN W. CHAMBERLAIN.

REFERENCES CITED

The following references are of record in the file of this patent:

UNITED STATES PATENTS

| Number | Name | Date |
|---|---|---|
| 439,076 | Loe | Oct. 21, 1890 |
| 452,418 | Thode | May 19, 1891 |
| 1,232,340 | Lehson | July 3, 1917 |
| 1,331,836 | Wilbanks | Feb. 24, 1920 |
| 1,620,669 | Littlejohn | Mar. 15, 1927 |
| 1,831,800 | Bales et al. | Nov. 17, 1931 |
| 2,279,527 | Rosheim | Apr. 14, 1942 |
| 2,315,106 | Brandt | Mar. 30, 1943 |